(12) United States Patent
Riddiford et al.

(10) Patent No.: US 11,404,936 B2
(45) Date of Patent: Aug. 2, 2022

(54) PORTABLE APPARATUS FOR GENERATING ELECTRICITY

(71) Applicant: DECIWATT LTD, London (GB)

(72) Inventors: Martin Riddiford, London (GB); Adrian Willis, Berkshire (GB)

(73) Assignee: DECIWATT LTD, London (GB)

(*) Notice: Subject to any disclaimer, the term of this patent is extended or adjusted under 35 U.S.C. 154(b) by 260 days.

(21) Appl. No.: 16/765,820

(22) PCT Filed: Nov. 23, 2018

(86) PCT No.: PCT/GB2018/053385
§ 371 (c)(1),
(2) Date: May 20, 2020

(87) PCT Pub. No.: WO2019/102202
PCT Pub. Date: May 31, 2019

(65) Prior Publication Data
US 2020/0395819 A1 Dec. 17, 2020

(30) Foreign Application Priority Data
Nov. 23, 2017 (GB) ...................................... 1719483

(51) Int. Cl.
*H02K 7/18* (2006.01)
*G06F 21/31* (2013.01)
(Continued)

(52) U.S. Cl.
CPC ........... *H02K 7/1853* (2013.01); *G06F 21/31* (2013.01); *H01M 10/486* (2013.01);
(Continued)

(58) Field of Classification Search
CPC .............. H02K 7/1853; H02K 7/1004; H02K 11/0094; H02K 7/1861; G06F 21/31;
(Continued)

(56) References Cited

U.S. PATENT DOCUMENTS

2008/0272733 A1 11/2008 Huang
2009/0008374 A1 1/2009 Fosbinder
(Continued)

FOREIGN PATENT DOCUMENTS

| JP | 2008125337 A | 5/2008 |
| WO | WO2014/195681 | 12/2014 |
| WO | WO2015/166235 | 11/2015 |

OTHER PUBLICATIONS

International Search Report of International Application No. PCT/GB2018/053385.

*Primary Examiner* — Ahmed Elnakib
(74) *Attorney, Agent, or Firm* — Blank Rome LLP

(57) ABSTRACT

A portable apparatus for generating electricity is provided comprising an electrical energy-generating device for generating electrical energy in response to input mechanical action. The apparatus comprises a drive mechanism having an elongate flexible member provided as a closed endless loop. A portion of the elongate flexible member is exposed so as to enable a user to grasp and pull said portion downward by a distance of at least 30 cm. The drive mechanism supplies the said mechanical action to the electricity-generating device, wherein said mechanical action is provided by user applying a downward force to the elongate flexible member so as to cause the elongate flexible member to move with respect to the mounting element. A re-chargeable battery is further provided for storing the electrical energy generated by the electrical energy-generating device. A mounting element enables the apparatus to be supported at a suspended position relative to the ground during use.

20 Claims, 9 Drawing Sheets

(51) Int. Cl.
*H01M 10/48* (2006.01)
*H02K 7/10* (2006.01)
*H02K 11/00* (2016.01)

(52) U.S. Cl.
CPC ........ *H01M 10/488* (2013.01); *H02K 7/1004* (2013.01); *H02K 11/0094* (2013.01)

(58) Field of Classification Search
CPC .............. H01M 10/486; H01M 10/488; H02J 7/007194; H02J 7/00; H02J 7/00302; H02J 7/00304; H02J 2207/40; H02J 7/0029; H02J 7/0042; H02J 7/0047; H02J 7/0048; H02J 7/32; H02J 7/35; Y02E 60/10
USPC .......................................................... 310/75
See application file for complete search history.

(56) References Cited

U.S. PATENT DOCUMENTS

| | | |
|---|---|---|
| 2011/0234175 A1 | 9/2011 | Hajee et al. |
| 2016/0094107 A1* | 3/2016 | Riddiford ................. F03G 3/00 290/1 C |
| 2017/0004781 A1 | 2/2017 | Riddiford et al. |
| 2017/0047810 A1* | 2/2017 | Riddiford ............ H02K 7/1004 |
| 2020/0395819 A1* | 12/2020 | Riddiford ......... H02J 7/007194 |

* cited by examiner

PORTABLE APPARATUS FOR GENERATING ELECTRICITY

RELATED APPLICATIONS

This application is a national phase application of PCT/GB2018/053385, filed Nov. 23, 2018, which claims priority to Great Britain Application No. 1719483.8, filed Nov. 23, 2017. The entire contents of those applications are incorporated herein by reference.

FIELD OF THE INVENTION

The present invention relates to a portable apparatus for generating electrical energy from input mechanical action provided by a user applying a downward force to an elongate flexible member.

BACKGROUND TO THE INVENTION

GravityLight™, available from Deciwatt Ltd (company no. 08589358) and described for instance by WO2015/166235, is a portable electrical energy generating apparatus designed to provide lighting to customers who do not have access to mains electricity. In particular, GravityLight™ was conceived to replace the use of harmful kerosene lamps in developing countries, where the low cost of such a device is critical to its acceptance and uptake. The device is operated by a user pulling on an elongate flexible member so as to lift a mass. The mass is then allowed to slowly descend under gravity so that its gravitational potential energy is converted into electrical energy by an electrical generator. Although other manually operated electrical generators are known, these devices generally suffer from a low light output and awkward charging mechanisms which typically involve the use of a hand crank. For example, some electrical generators are configured to be held by one hand and operated by the other hand during use: thereby limiting the mechanical input power that can be manually provided.

The electrical output from GravityLight™ is inherently limited both by the weight of the elevated mass and the height to which it can be raised by a user. It is desirable to increase this electrical output beyond these limits, for example so that enough electrical energy may be output so as to charge a modern-day mobile phone. It is also desirable for the device to remain portable and inexpensive so that it may provide an effective alternative to the use of kerosene lamps in off-grid markets, particularly within the developing world. The invention is set primarily in the context of solving these problems, although its usefulness extends beyond off-grid markets.

SUMMARY OF THE INVENTION

A first aspect of the invention provides a portable apparatus for generating electricity, the apparatus comprising:
- an electrical energy-generating device for generating electrical energy in response to input mechanical action;
- a drive mechanism comprising an elongate flexible member provided as a closed endless loop, wherein a portion of the elongate flexible member is exposed so as to enable a user to grasp and pull said portion downward by a distance of at least 30 cm;
  wherein the drive mechanism is configured to supply the said mechanical action to the electricity-generating device, wherein said mechanical action is provided by a user applying a downward force to the elongate flexible member so as to cause the elongate flexible member to move with respect to the mounting element;
- a re-chargeable battery configured to store the electrical energy generated by the electrical energy-generating device; and
- a mounting element configured to enable the apparatus to be supported at a suspended position relative to the ground during use.

A portable apparatus for generating electricity is thereby provided which can store and deliver more electrical energy than GravityLight™ whilst maintaining several of its key benefits. When GravityLight™ was first manufactured, re-chargeable batteries were considered to be too expensive and inefficient for the intended marketplace. Recent reductions in production costs and improvements in battery technology have meant that this is no longer the case. Unlike GravityLight™, the apparatus of the invention incorporates a re-chargeable battery that is used to retain electrical energy that is generated by action of the drive mechanism. This enables more electrical energy to be stored and consequently output than is possible in the case of GravityLight™. The apparatus therefore provides a more attractive alternative for generating electricity in off-grid markets where there is no access to mains electricity. Another key difference between these apparatus that should be noted is that the input mechanical action that drives the electrical energy-generating device is now provided directly by the user, rather than by the gradual descent of a suspended mass. This is practically easier to achieve.

The drive mechanism is operated by action of an elongate flexible member, typically engaging with a sprocket or pulley. This is generally more ergonomic and easier to operate than hand cranks, for instance. Furthermore, because the drive mechanism may be operated whilst the apparatus is suspended via the mounting element, and because the exposed portion may be pulled downward by a distance of at least 30 centimetres, both hands can be used in sequence (hand-over-hand) to supply the mechanical input. Significantly more mechanical input power can therefore be provided in relation to some prior art portable generators. For example, sufficient access may be provided for an upper end of the exposed portion to be held in the palm of a user's hand and pulled downwards by at least 30 centimetres so as to drive the electrical energy-generating device. The length of the exposed portion then ensures that a second hand may grasp an upper end of the exposed portion before the first hand has reached the lower end of the loop. The second hand may then apply a downward force to the upper end before the exposed portion is released by the first hand, meanwhile maintaining continuous motion of the loop.

The apparatus preferably further comprises a light source configured to emit light in response to electrical energy supplied by the re-chargeable battery. Although the re-chargeable battery may be used to operate a number of different output devices, a light source is particularly desirable for users in off-grid markets without reliable access to light at night. The apparatus may hence help to reduce the reliance on dangerous kerosene lamps in some parts of the world. We have also found that there is an intuitive mental association between pulling on an elongate flexible member and activating a light source. Research has shown that most users would prefer to pull down on an elongate flexible member rather than turn a hand crank so as to obtain a light.

Due to the reliance on input mechanical action, it is desirable that any electrical losses in the system are low. The light source therefore preferably comprises an array of light emitting diodes. This array may comprise one or more light emitting diodes. The array may output light at a sufficiently high brightness and efficiency so as to light a small room or an area of a room for several hours.

The light source is typically integrally formed with the apparatus. A key benefit of the apparatus however is that enough electrical energy may be stored and then output so as to power multiple different output devices. The apparatus therefore preferably further comprises one or more output connectors, wherein each said output connector is configured to provide an electrical connection between an external output device and the battery. Each said output connector typically comprises a socket. Advantageously still, one or more said output connectors comprises a USB socket. These typically output electricity at a higher power than is possible (at least for prolonged periods) using GravityLight™, for instance. A range of different mobile phones, potentially with different input power requirements, may be charged via the USB socket.

The apparatus has potential applications outside of off-grid markets. For example, the apparatus may further comprise a mains supply detector configured to detect an outage in a mains electricity supply and to supply electrical energy from the battery (e.g. operate the light source, if provided) in response to the detected outage. Optionally input electrical energy may be provided to the battery via the mains supply detector. This provides a source of energy for the battery such that the battery may be fully charged when the outage is detected. Additional electrical energy may then be manually input by operation of the drive mechanism.

The apparatus preferably further comprises a control unit configured to control the electrical power supplied by the re-chargeable battery between two or more predetermined values in response to an input provided by a user. One of these predetermined values may simply be a value of zero Watts whereby no electrical energy is output and the other a predetermined value in excess of this. Alternatively a range of values in excess of zero Watts may be obtained using the control unit. The time remaining before the electrical energy stored by the battery falls below a threshold may then be extended by a user selecting a lower power output.

A further benefit may be provided wherein the apparatus further comprises a security device configured to control electrical power supplied by the re-chargeable battery based on an authorisation procedure. Such a security device may prevent unauthorised use of the apparatus by people unable to carry out the authorisation procedure. This may help to reduce avoidable wear and tear of the apparatus. The authorisation procedure may also be linked to a payment procedure so that a user may only "unlock" the device if he or she has paid for its use, for example on a "pay-as-you-go" basis. The security device preferably comprises an input device, such as a keypad, and the authorisation procedure preferably comprises monitoring whether a security code is input via the input device and allowing electrical power to be supplied from the battery if said security code is input. The security code may be initially provided to the purchaser of the apparatus or later communicated, for example across a data cellular network, such as by SMS message, after a pay-as-you-go payment has been made.

The apparatus preferably further comprises a processor configured to monitor the electrical energy stored by the battery and to estimate the remaining battery life based on the monitored electrical energy, wherein the remaining battery life indicates the time remaining before the electrical energy stored by the battery falls below a threshold. This estimation is typically made with reference to a monitored electrical energy consumption rate and one or more calibration levels whereupon the energy stored by the battery is known. The electrical energy input to the battery may also be monitored in order to calculate the electrical energy stored by the battery. It is desirable to estimate the remaining battery life (often referred to as the "state-of-charge") because, unlike GravityLight™, a user cannot accurately estimate how long the apparatus will continue to generate electricity for from the height of a suspended mass. This information can instead be obtained and communicated by the processor. The processor may form a microcontroller. The processor may also be provided with memory (such as volatile and non-volatile memory) and one or more microprocessors for operation.

The apparatus preferably further comprises an electronic display, wherein the processor is configured to provide a signal to the display so as to cause the display to indicate the remaining battery life. Advantageously, this may provide the user with instant feedback so as to encourage him or her to input mechanical action so that the battery may continue to supply electrical energy to any output devices that are electrically connected. The user may also be made aware of the benefit each pull of the elongate flexible member has in terms of extending the useful electrical output from the light source. Typically the electronic display comprises a numerical counter and wherein the signal causes the numerical counter to indicate the remaining battery life. For example, the remaining battery life may be expressed in terms of minutes and/or hours. The remaining battery life is typically calculated in accordance with the power supplied by the battery. Optionally a process of Coulomb counting may be used to calculate the remaining battery life however estimates of the internal impedance or voltage measurements may in theory be used instead.

Typically the mounting element is selected from the group comprising: a bracket, a loop, a strap, a wall bracket, a door mount and a pole mount. The mounting element may be configured to engage with a mounting fixture so as to support the apparatus at the suspended position. Most typically the mounting fixture comprises a hook, such as a screw hook. The mounting fixture may be conveniently attached to a support, such as a wooden beam, at the suspended position. The apparatus may be suspended from a number of different objects and potentially even worn by a user, for example on his or her clothing.

The elongate flexible member is provided as a closed endless loop. Kinetic energy may hence be input to the electrical energy-generating device by continued rotation of the loop in a single direction. Most typically the elongate flexible member is a sprocket belt, a chain, a strap or a cord. The input mechanical action is applied directly to the elongate flexible member by a user's hand. Further ancillary equipment, such as gears, for driving the elongate flexible member is not required. The exposed portion therefore typically hangs freely under gravity. Furthermore the exposed portion may be pulled downward by a distance of at least 30 cm, preferably at least 50 cm, when supplying said input mechanical action. This provides sufficient access for hand-over-hand motion. The elongate flexible member may comprise gripping elements. The gripping elements may be grasped by a user's hand so that a larger downward force can be more comfortably applied to the elongate flexible member. Each gripping element therefore typically fits within the palm of a user's hand.

A particular benefit may be provided wherein the elongate flexible member comprises a plurality of modules, wherein each said module comprises a drive surface, a male attachment member and a female attachment member; wherein, for each said module, the male attachment member is provided on an opposite end of the drive surface from the female attachment member; wherein a male attachment member of a first module from the plurality of modules is configured to engage with a female attachment member of a second module from the plurality of modules so as to form a connected element; wherein the connected element is formed between the drive surfaces of the first and second modules; wherein the drive mechanism further comprises a sprocket, the sprocket comprising a toothed portion configured to couple with the drive surface of each said module, the sprocket further comprising a re-entrant portion configured to couple with the or each connected element during rotation of the elongate flexible member. By assembling the elongate flexible member from a plurality of modules in this manner, the length of the exposed portion of the elongate flexible member may be extended or shortened as desired depending on the application. The modules may also be independently replaced in the event they become worn or damaged.

Advantageously, the sprocket may be shaped such that contact between a connected element and the sprocket, during rotation of the elongate flexible member, does bring the drive surface out of engagement with the toothed portion. For example, the circumference of the sprocket may be equal to the length of each said module. Typically only one re-entrant portion is provided on the sprocket in this instance. In the event that a larger sprocket is desired, multiple said re-entrant portions may be provided.

It is particularly desirable that each said module comprises a first surface and a second surface, wherein the first surface is opposite from the second surface, wherein the first surface comprises the drive surface, and wherein the second surface is substantially flat. Preferably still the connected element does not extend below the second surface. This enables the footprint of the apparatus to be reduced since an empty region does not need to be left around the sprocket for the movement of features protruding from the second surface.

Typically the drive mechanism comprises one or more pinching elements in addition to a sprocket, wherein each said pinching element is configured to press the elongate flexible member onto the sprocket. For example, each said pinching element may be configured to exert a pressure onto the second surface of each said module in the direction of the sprocket. The one or more pinching elements may thereby maintain mutual engagement between the drive surface and the toothed portion. This is useful as the elongate flexible member may otherwise become disengaged with the sprocket, particularly when it is not under tension. Each pinching element typically comprises a roller.

The apparatus preferably further comprises a control unit and a battery protection system, wherein the control unit is configured to monitor one or more measurands from the battery (e.g. the battery temperature and/or the potential difference across the battery) and to output a "watchdog signal" to the battery protection system only if each said measurand is within a respective predetermined range. The watchdog signal may hence provide an indication of whether the apparatus is functioning correctly. For example the watchdog signal may only be output if a given measurand is above or below a particular threshold value for that measurand. The battery protection system may be configured to monitor the watchdog signal and control the current supplied to the battery from the electrical energy-generating device in response to said watchdog signal. For example, the battery protection system may control a variable resistor electrically connected between the electrical energy-generating device and the battery such that sufficient current for charging the battery may only be provided to the battery when the watchdog signal is detected by the battery protection system. The battery protection system may therefore advantageously prevent further current from being input to the battery if the temperature or state of charge of the battery is above a predetermined value which is deemed safe. Failure of the battery may therefore be avoided. The control unit may be further configured to receive a drive signal indicative of the magnitude of the input mechanical action and output the watchdog signal only if said drive signal is above a drive threshold, for example stored in memory. This can prevent unwanted discharging of the battery whilst input mechanical action is being provided to the drive mechanism.

The presence of a rechargeable battery enables other potential modes of operation for the apparatus beyond those which were available for GravityLight™. For example, the apparatus may further comprise an input connector, typically comprising an input socket, connectable to an external power source, wherein the battery is further configured to receive electrical energy from the external power source via the input connector. Advantageously, the battery may therefore be charged without the need for a user to operate the drive mechanism.

The control unit is preferably configured to receive an external power signal indicative of the magnitude of the potential difference generated by the external power source, and the control unit is preferably further configured to output the watchdog signal only if said external power signal is above an input threshold. Preferably still the drive mechanism provides a mechanical resistance in accordance with the electrical power input to the battery. For example, the mechanical resistance may scale (e.g. linearly) according to the electrical power input to the battery. The apparatus preferably further comprises a cadence control system configured to monitor the input mechanical action and increase the mechanical resistance of the drive mechanism in response to an increase in the input mechanical action so as to increase the electrical power supplied to the battery. This enables users to input a higher electrical power to the battery by applying increased mechanical power to the drive system, without needing to rotate the drive mechanism (including the elongate flexible member) at a higher speed. This is practically easier to achieve for the user, in particular when inputting energy using hand-over-hand motion. The cadence control system may equally be configured to decrease the mechanical resistance of the drive mechanism in response to a decrease in the input mechanical action. This enables a user who is not able to provide a high mechanical input to nonetheless rotate the drive mechanism and generate electrical energy for charging the battery.

The external power source preferably comprises a photovoltaic cell. Solar energy may hence be converted into electrical energy that is stored by the battery and then delivered to the light source. Recent technological advancements have reduced the cost of photovoltaic cells significantly, making their use in combination with an apparatus directed for use in the developing world a more viable option than it was when GravityLight™ was first conceived.

Second and third aspects of the invention will now be discussed. These may share the advantages discussed in relation to the first aspect and may further comprise any of the aforementioned features.

A second aspect of the invention provides a kit comprising: the apparatus of the first aspect and an external power source, wherein the re-chargeable battery is configured to receive electrical energy from the external power source.

A third aspect of the invention provides a drive mechanism comprising: a sprocket; and a plurality of modules, wherein the plurality of modules are configured to be connected together so as to form an elongate flexible member in the form of a closed loop; wherein each said module comprises a drive surface, a male attachment member and a female attachment member; wherein, for each said module, the male attachment member is provided on an opposite end of the drive surface from the female attachment member; wherein a male attachment member of a first module from the plurality of modules is configured to engage with a female attachment member of a second module from the plurality of modules so as to form a connected element; wherein the connected element is formed between the drive surfaces of the first and second modules; wherein the sprocket comprises a toothed portion configured to couple with the drive surface of each said module, the sprocket further comprising a re-entrant portion configured to couple with each said connected element during rotation of the elongate flexible member about the sprocket.

BRIEF DESCRIPTION OF THE DRAWINGS

Embodiments of the invention will now be discussed with reference to the accompanying drawings in which.

DETAILED DESCRIPTION

Figure 1:
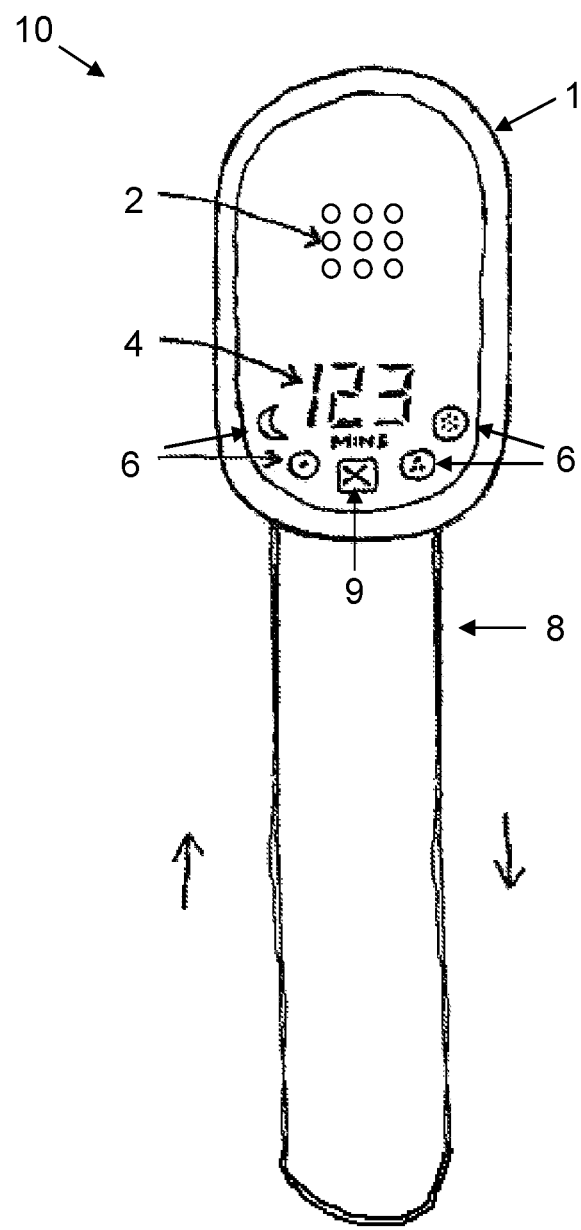
FIG. 1 is a front view of the apparatus according to an embodiment.

A front view of a portable apparatus 10 for generating electricity is shown by FIG. 1. The housing 1 is formed from two parts manufactured from a rugged plastics material. The two parts form front and rear "halves" of the housing 1, the front half being illustrated in FIG. 1.

The apparatus 10 comprises a drive mechanism 30 (shown in FIG. 5) comprising a gear system that is contained within the housing 1. The gear system is coupled to the elongate flexible member 8 in a pulley arrangement. An exposed portion of the elongate flexible member 8 hangs freely below the housing 1 under gravity, as shown in FIG. 1. The elongate flexible member 8 is provided as a closed endless loop wherein an upper end of the loop is contained within the housing 1 and a lower end is formed on the exposed portion. Either side of the exposed portion may be grasped by a user and then pulled downwards by a distance of at least 30 cm, as shown by FIG. 1, to input mechanical energy into the apparatus 10. Mechanical energy is typically input however by continued rotation of the loop in a single direction. Both hands can hence be used in sequence (hand-over-hand) to supply a mechanical input in an efficient manner.

The input mechanical action is transferred via the gear system to an electrical generator 32 (shown in FIG. 5) provided inside the housing 1. The electrical generator 32 forms an alternator that converts the kinetic energy into electrical energy. This electrical energy is then supplied to a rechargeable battery 32 via a rectifier and voltage regulator 34, where it is stored as electrical potential energy. The rechargeable battery 36 is typically a lightweight lithium battery, such as a 18650 or 26650 battery. Efficiency losses in the system will typically mean that a mechanical input of 20 Watts provided by the user will equate to an electrical power of around 16 Watts supplied to the battery 36.

A light source in the form of an array of nine high luminosity LEDs (light emitting diodes) 2 is located within the central upper region of the housing 1, as shown by FIG. 1. The front face of the front half of the housing 1 is primarily formed of a translucent material so as to enable the light produced by the LEDs 2 to diffuse through the front of the housing 1. A reflective surface may be arranged inside the housing 1 so as to reflect additional light emitted by the LEDs 2 through the front of the housing 1.

Figure 5:
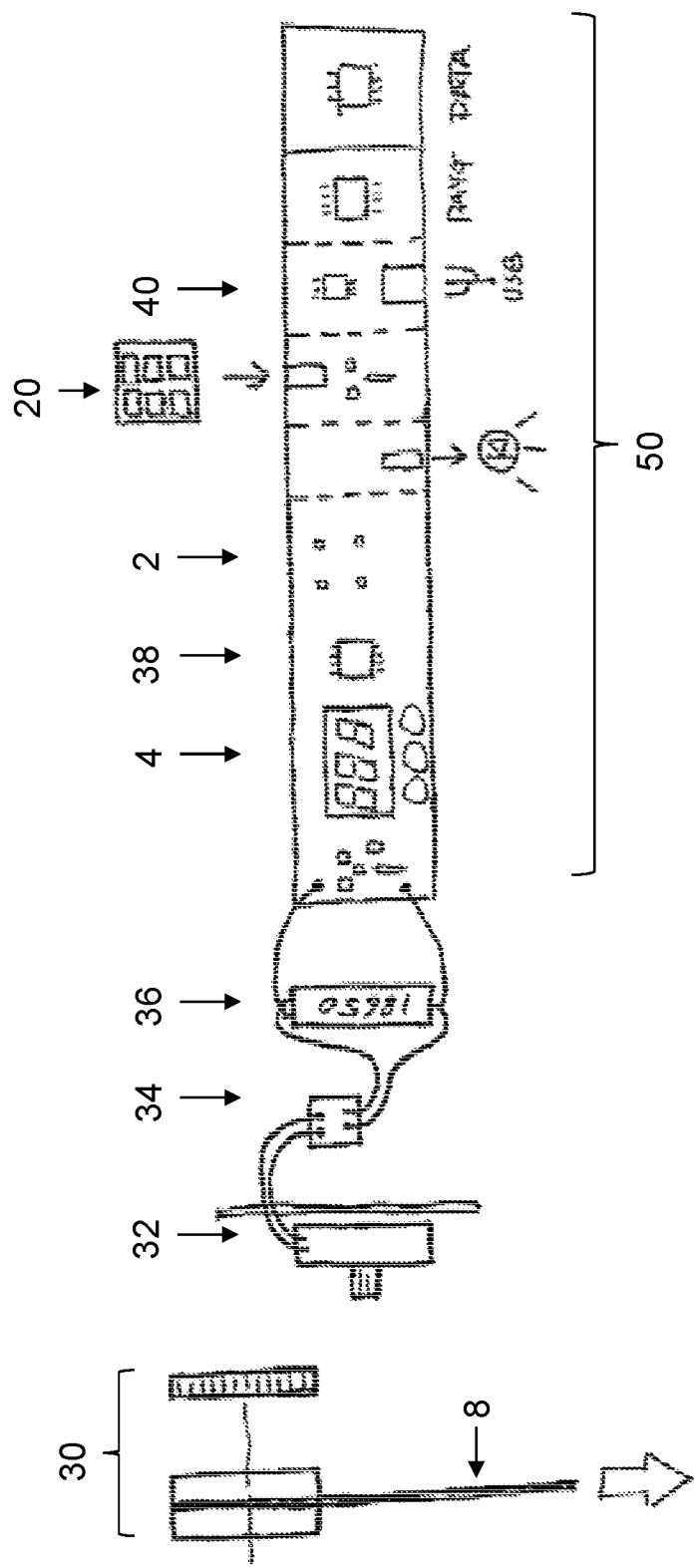
FIG. 5 is a schematic illustration of the components of the apparatus according to an embodiment.

Electrical energy is provided to the LEDs 2 by the battery 36 (shown in FIG. 5). A single pull of the elongate flexible member 8 may generate enough electrical energy to light the LEDs 2 at around 50 lumens of light for 30 seconds. We have found that for most people there is an intuitive link between pulling down on an elongate flexible member 8 and generating light. This is also a more ergonomic and efficient way for inputting mechanical energy to the system than operation of a hand crank, for example.

Figures 2A, 2B, 2C, 2D:
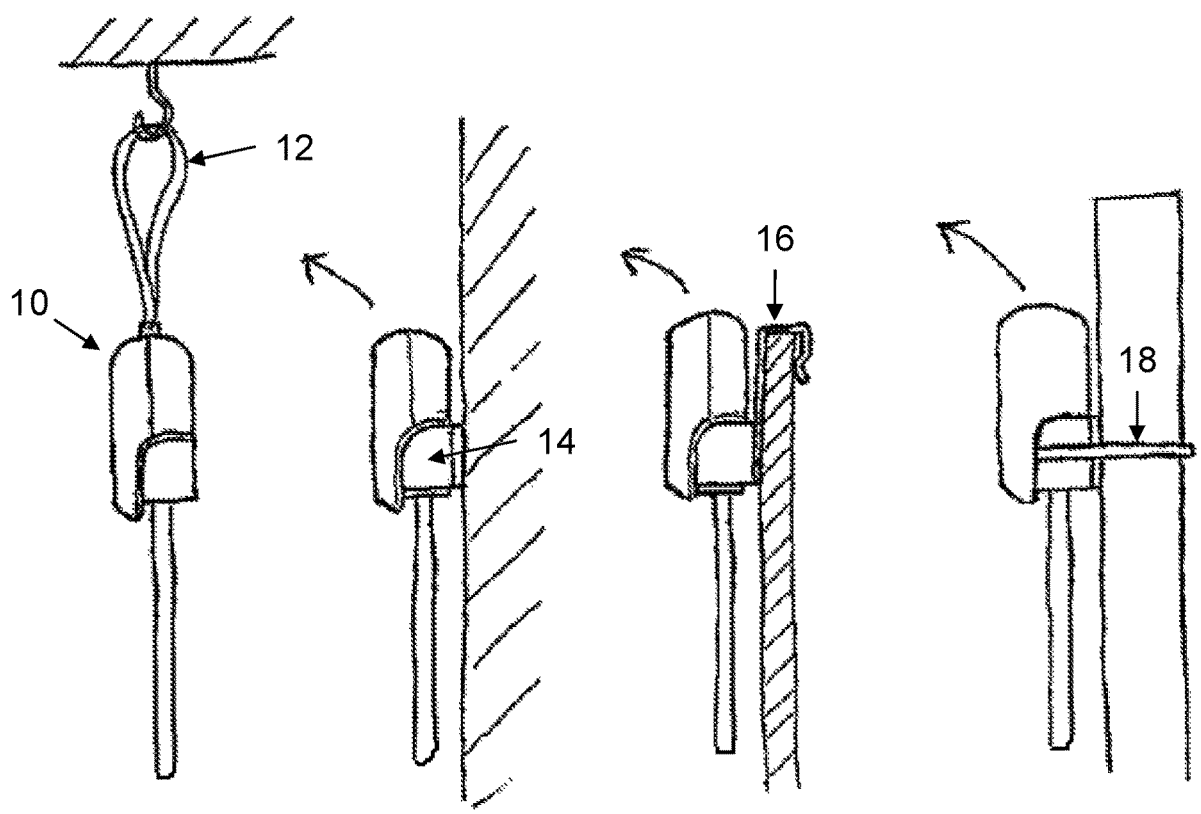
FIGS. 2A-2D are side views of the apparatus with mounts according to different embodiments.

The apparatus 10 is portable in that it may be picked up and carried by a user without mechanical aid. For example, the apparatus 10 typically weighs less than 2 kg, more typically less than 1 kg. The apparatus 10 comprises a mount for suspending the apparatus 10 at an elevated position with respect to the ground (e.g. elevated with respect to the Earth's surface or the floor of the room in which the apparatus 10 is mounted). This enables optimal light dispersion from the LEDs 2 into the surrounding room, as well as providing a region in which the elongate flexible member 8 may be operated. Different possible mounts are illustrated by FIGS. 2A-2D. In the embodiment of FIG. 2A, the apparatus 10 is hung from a hook using a strap 12 that is connected to the housing 1. In the embodiment of FIG. 2B the housing 1 is coupled to a wall via a wall mount 14. In the embodiment of FIG. 2C the apparatus 10 is mounted to a door frame via a door mount 16. Lastly, in the embodiment of FIG. 2D the apparatus 10 is coupled to a pole via a pole mount 18. Advantageously, the apparatus 10 may be lifted off its mount once charged, thereby enabling its use as a portable lantern. In a further embodiment the mount may comprise a bracket or loop that forms part of the housing 1. The apparatus 10 may be mounted to a support structure, such as wooden strut, by engagement with a hook (e.g. a screw hook) that is fixed to the support structure. Unlike some manually operated electrical energy generators that are manually held during use, the mount enables the user to use both hands when inputting mechanical energy. This is more user-friendly and enables a larger input power to be achieved.

A control unit comprising a set of five control buttons 6, 9 (shown in FIG. 1) is provided on the front of the housing 10, below the LEDs 2. A master control button 9 may be operated to toggle the apparatus 10 between an ON state and an OFF state so as to control whether electrical power may or may not be supplied from the battery 36. The OFF state may be selected so that any remaining electrical energy stored by the battery 36 is retained for later use. The master control button 9 separates the four brightness control buttons 6 into two pairs. The leftmost brightness control button 6 reduces the brightness of the LEDs 2 to 10 lumens such that the LEDs 2 provide a night light. Each of the remaining brightness control buttons 6 to the right of this successively increases the brightness further, up to a maximum of 40 lumens, which is effected by operation of the rightmost brightness control button 6.

Operation of the rightmost brightness control button 6 will cause the re-chargeable battery 36 to discharge at the fastest rate. It is desirable that one of the brightness values achieved by the brightness control buttons 6 requires around a 1:60 input to output ratio, equating to every second of pulling giving a minute of light, meaning that every minute gives an hour. This is easily understandable for the user.

Figure 4:
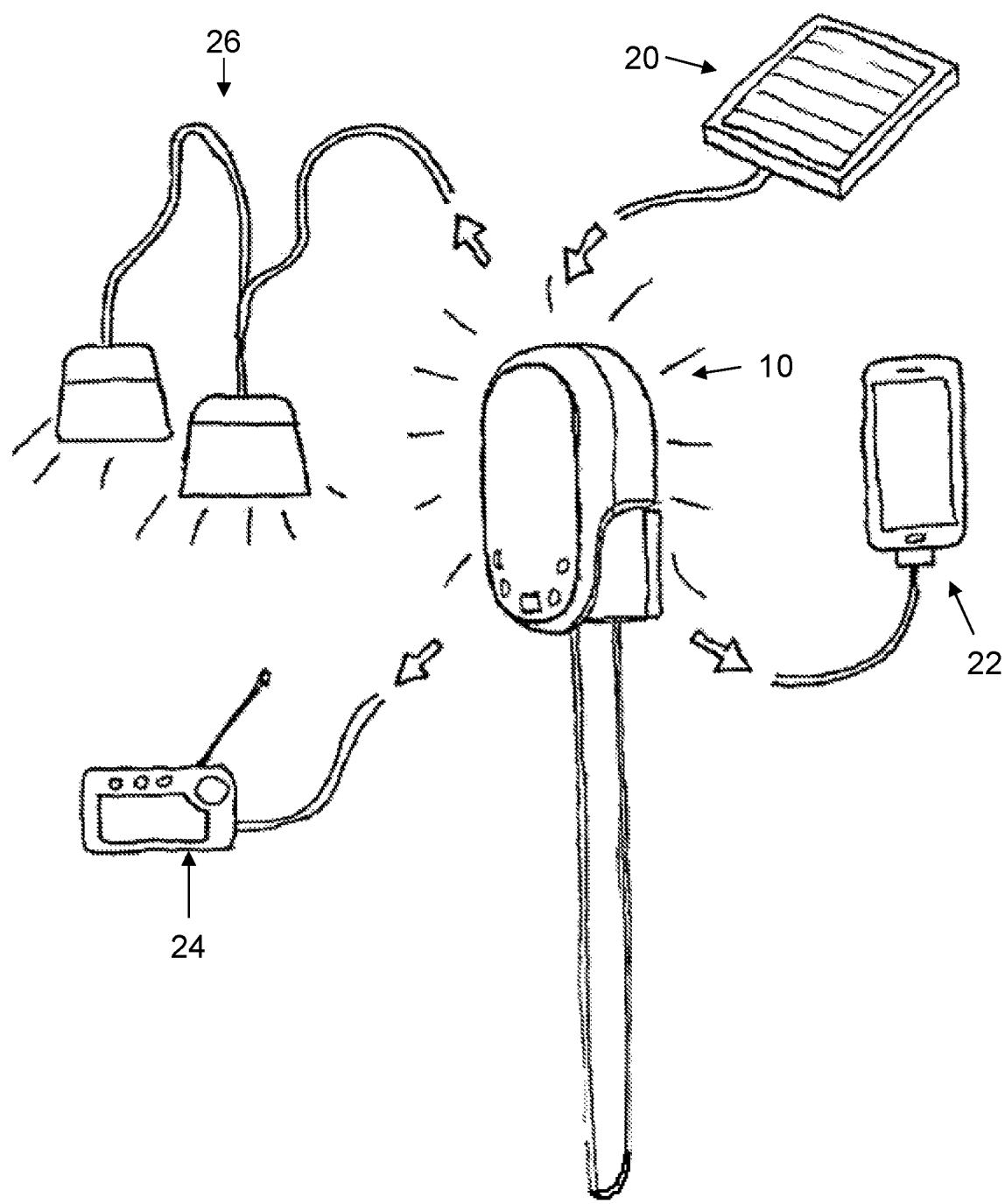
FIG. 4 is an illustration of the use of the apparatus according to an embodiment with any of a plurality of external devices.

In alternative embodiments a single multi-function control button may be provided in the form of a momentary action switch instead of the five control buttons 6, 9 previously discussed. This may be located centrally in place of the master control button 9. The particular function provided by the multi-function control button may be selected by a user according to the length of time for which this button is pressed. For example, if the button is pressed for a short period (e.g. less than 0.5 seconds) this may turn the LEDs 2 either on or off. If the button is pressed for a longer period (e.g. between 0.5 and 2 seconds) this may increase or decrease the brightness of the LEDs 2 between the four predetermined values. In the event that a plurality of output devices are connected to the apparatus 10 (as shown in FIG. 4 for example), the multi-function control button may be pressed for a yet longer period (e.g. more than 2 seconds) in order to select each output device in turn. The electrical power supplied to each said output device may hence be independently controlled using the multi-function control button. This provides a simple and user-friendly interface for controlling the illumination and the battery resources.

The apparatus 10 further comprises a security device for preventing unauthorised use of the apparatus 10. The security device comprises a mixture of hardware and software. In the illustrated embodiment the security device is operated using the control buttons 6, 9. Optionally a dedicated keypad may be provided however. A user may operate the security device during an authentication procedure to enter a security code. If the security code is correctly entered, the security device will enable use of the apparatus 10, for example by permitting electrical power to be supplied to the LEDs 2, at least for a predetermined period. This is desirable in order to reduce wear and tear of the apparatus 10. The security code could be supplied to the user via SMS message and so use of the apparatus 10 may be authorised on a pay-as-you-go basis, for example.

Figure 3A:
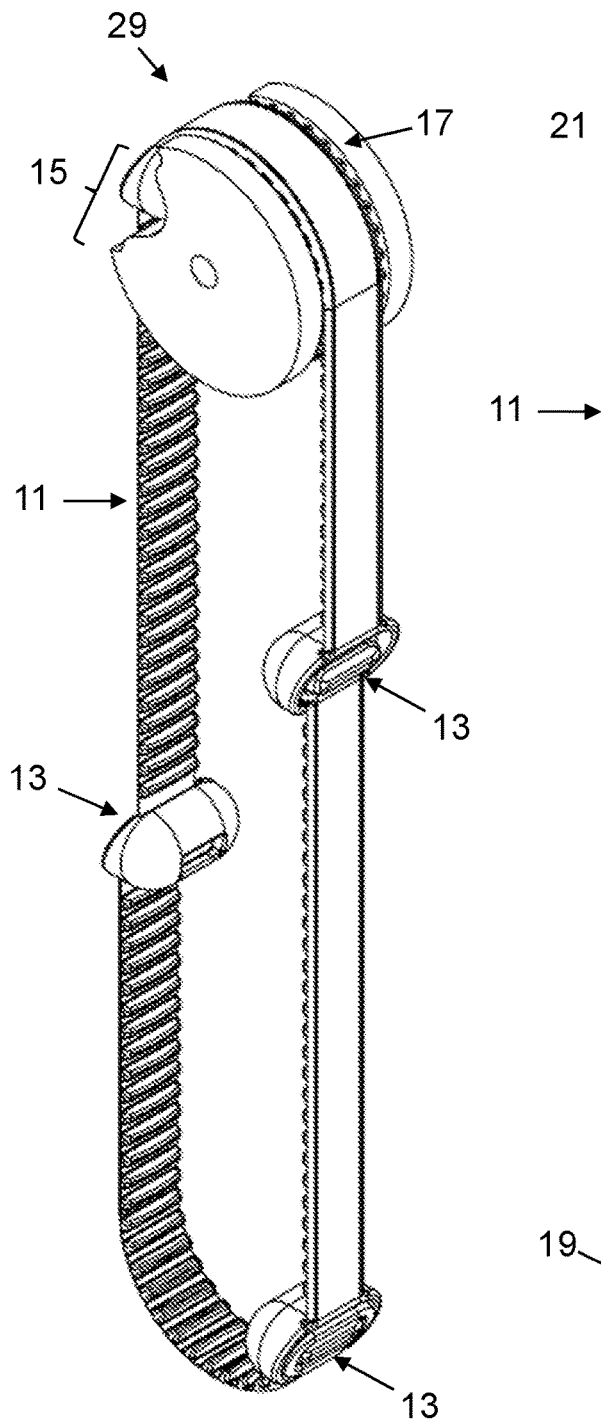
FIG. 3A is a perspective view of a drive system comprising a modular elongate flexible member wrapped around a sprocket.
Figure 3B:
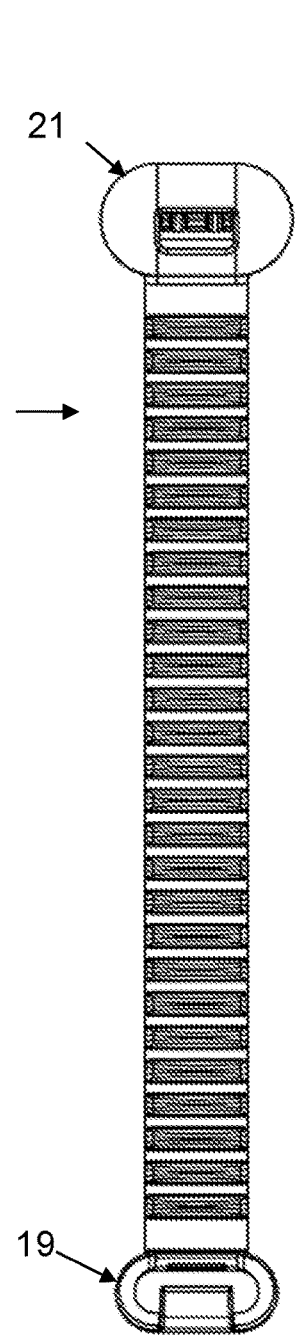
FIG. 3B is a front view of a module of an elongate flexible member according to an embodiment.
Figure 3C:
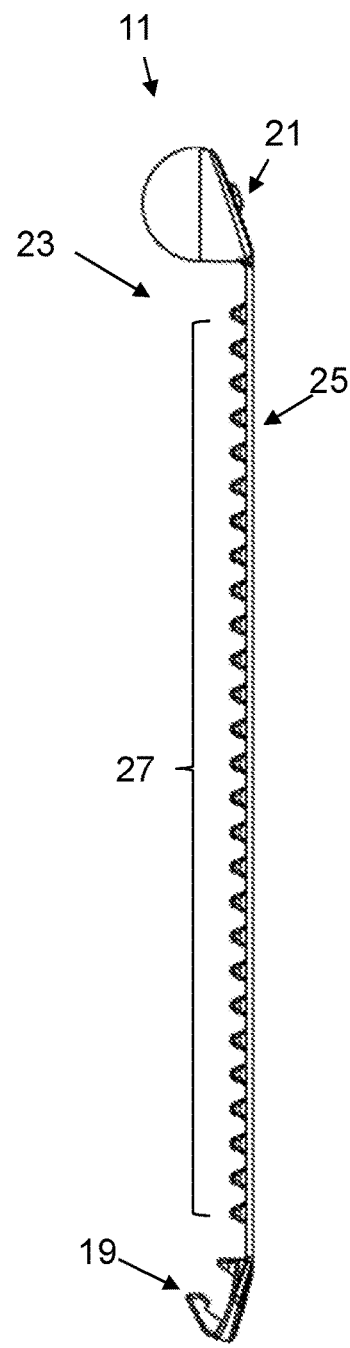
FIG. 3C is a side view of a module of an elongate flexible member according to an embodiment.

In a further embodiment shown by FIGS. 3A-3C, the elongate flexible member is formed from modules 11 that connect together. This enables the length of the exposed portion to be altered to suit the user requirements. Furthermore it facilitates easy servicing in case of damage or wear. Each module 11 comprises a ribbed drive surface 27 that is configured to engage with a toothed portion 17 of a sprocket 29 so as to cause rotation of the sprocket 29 in response to a downward force applied to the module 11.

The modules 11 are attached together using male and female attachment members 19, 21 that are provided on opposite ends of the drive portion 27, as shown by FIGS. 3B and 3C. The male attachment members 19 each comprise a hook whereas each female attachment members 21 each comprise a loop. The male attachment member 19 of a given module 11 may be configured to engage with the female attachment member 21 of the same module 11 (depending, for example, on the length and flexibility of the drive portion 27). A plurality of modules 11 are typically interconnected however, as shown by FIG. 3A. Thus a male attachment member 19 of a first module may attach to a female attachment member 21 of a second module, and a male attachment member 19 of the second module may attach to a female attachment member 21 of a third module etc. Typically more than three modules 11 will be provided. Four interconnected modules 11 are shown in FIG. 3A, although the length of the exposed portion of the loop may be adjusted by adding or removing additional modules 11.

When mutually connected, the male and female attachment members 19, 21 form a connection element 13 located at the end of the drive portion(s) 11. The connection element 13 may be shaped to enable easy gripping of the elongate flexible member by a user, thereby enabling the user to generate more downward force on the drive mechanism. The sprocket 29 comprises a re-entrant portion 15 that is configured to engage with the connection elements 13. The presence of the re-entrant portion 15 provides the sprocket 29 with a non-circular outline, as can be seen from FIG. 3A. The re-entrant portion 15 is shaped so as to contain the connection element 13 during its rotation about the sprocket 29. At least part of the drive surface 27 from a module 11 therefore remains engaged with the toothed portion 17 at all times during rotation of the elongate flexible member.

Only one re-entrant portion 15 is provided in the embodiment of FIG. 3A. The length of each module 11 is therefore chosen to be equal to the circumference of the sprocket 29 in order to ensure that each connection element 13 engages with the re-entrant portion at the appropriate position during rotation of the elongate flexible member. In the event that multiple re-entrant portions are provided around the sprocket, the length of each module will be equal to the arc length between each said re-entrant portion.

Each module 11 comprises a first surface 23 and a second surface 25, wherein the first surface 23 faces in an opposite direction from the second surface 25. The drive surface 27 is provided along the first surface 23. The second surface is substantially flat when the module 11 is held taught, as shown by FIG. 3C. By contrast, the ribs of the drive surface 27, the male attachment feature 19 and the female attachment feature 21 each protrude from the first surface 23. A consequence of this is that there is no need to leave an empty "part clearance region" around the sprocket 29 to enable movement of any features that protrude from the second surface 25, as the module 11 travels about the sprocket 29. The sprocket 29 may therefore be more closely integrated with other components within the housing 1 and so the overall size of the apparatus 10 can be reduced.

A particular advantage of the apparatus 10 is that enough electrical energy may be stored and subsequently delivered by the battery 36 to power to a plurality of different external output devices, potentially simultaneously. Some examples of such external output devices are shown by FIG. 4, which shows electrical energy being supplied from the battery 36 to a mobile phone 22 (such as a smart phone), a radio 24 and external lighting devices 26. A further benefit is that additional electrical energy may be supplied to the battery 36 by an external power source. FIG. 4 illustrates an external power source in the form of a photovoltaic cell 20 providing a supply of electrical energy to the battery 36. Advantageously, this may help to reduce the frequency with which the user needs to manually operate the drive mechanism and provides a useful mechanism for charging the battery 36 during the day. The photovoltaic cell 20 is electrically connected to the battery 36 via an input connector on the apparatus 10, typically comprising a socket.

The battery 36 is electrically coupled to the LEDs 2 and any external output devices that are provided via a printed circuit board (PCB) 50. A schematic example of this is shown by FIG. 5. An electronic processor 38 is configured to monitor the electrical energy stored by the battery 36 and to estimate the remaining battery life based on the monitored electrical energy. The remaining battery life (or "state-of-charge") indicates the time remaining before the electrical energy stored by the battery 36 falls below a threshold. The threshold represents the limit of where a useful electrical output can no longer be provided and is typically around 15% of the total capacity for the battery 36. The apparatus 10 will cease to output electrical energy when this threshold is reached and so the LEDs 2 will turn off automatically. Advantageously, the battery 36 will retain electrical energy below the threshold such that the LEDs 2 may be lit as soon as the input mechanical action is supplied, even if the energy stored by the battery 36 is initially below the threshold. An instantaneous electrical output may therefore be achieved by operation of the elongate flexible member 8. Optionally, operation of the control unit will cause the battery 36 to power the LEDs 2 (or any other output devices provided) for a predetermined period (e.g. 10 seconds) even when the energy stored by the battery 36 is below the threshold. This may provide an emergency lighting function.

The remaining battery life may be estimated by the processor 38 by incorporating a process known as Coulomb counting. An example of this will be later discussed with reference to FIG. 8. The processor 38 is then configured to send a signal to an electronic display 4 so as to dynamically indicate the remaining battery life. The display 4 is projected through the front face of the housing 1 so that it is visible to a user. Advantageously, this provides the user with simple feedback to encourage him or her to input more mechanical action to ensure continued electrical output from the apparatus 10. The user may also be made aware of the benefit each pull of the elongate flexible member 8 has in terms of extending the useful electrical output from the LEDs 2. The display 4 provides a three digit, seven segment numerical counter displaying the time left until the LEDs 2 turn off in minutes and/or hours. FIG. 1 illustrates the remaining battery life being indicated in terms of minutes. Typically the display 4 will switch off a predetermined period from when the elongate flexible member 8 was last operated, for example five seconds after it was last pulled. Optionally the display 4 may indicate the charging rate whilst electrical energy is being supplied to the battery 36. The display 4 may further output cues (typically words such as "PULL" or "PAY") so as to encourage the user to perform a task, for example provide pull down on the elongate flexible member or input a security code.

The PCB 50 may further comprise one or more output connectors typically in the form of sockets, such as a USB socket 40 for providing an electrical connection between the battery 36 and any external output devices, such as a mobile phone 22. An appropriate current will then be supplied to the mobile phone 22, typically at 500 mA or 900 mA. Electrical energy may also be transferred from the photovoltaic cell 20 to the battery 36 via the PCB 50.

In a further embodiment the apparatus may comprise a mains supply connection for placing the processor in electrical connection with a mains electricity supply (typically via a transformer). The processor may monitor an electrical signal provided by the mains supply, such as a potential difference, and operate the LEDs 2 in the event of a failure in the mains supply power. Optionally electrical energy may be provided to the battery 36 via this connection.

There is a growing demand for "smarter products", so that manufacturers, product designers and their partners can assess their impact. The processor 38 may therefore collect and store usage information, and transfer this data to the mobile phone 22 when the mobile phone 22 is connected for charging. This data may then be transferred wirelessly from the mobile phone 22, potentially using an Internet connection or by SMS to a remote server for analysis. For example, periods of overcharging may be logged and then communicated to the server. This may provide useful information if the apparatus 10 fails.

The processor 38 may control the electrical energy delivered from the battery 36 to the LEDs 2 and any external output devices that are connected. For example, a minimum pull speed may be set such that electrical energy will only be provided by the battery 36 if the elongate flexible member 8 is pulled in excess of this speed. This may be practically achieved by ensuring that electrical energy is only provided from the battery 36 to the output devices if the voltage at the generator 32 exceeds a threshold. Similarly, the electrical output from the battery 36 may be controlled by the processor 38 according to the remaining battery life. For example, if the elongate flexible member 8 is pulled once and at a velocity above the minimum pull speed, such that the electrical energy stored by the battery 36 rises above the threshold for powering the LEDs 2, the LEDs 2 may be illuminated at the dimmest setting allowed by the control unit. If more mechanical energy is supplied via the drive mechanism 30, and the electrical energy stored by the battery 36 consequently increases by a predetermined amount, then the brightness of the LEDs 2 may increase to the previously selected brightness setting.

The processor 38 may further be operable to detect any time that the elongate flexible member 8 is pulled too vigorously such that the input power exceeds a threshold. A warning light may then be illuminated or a corresponding message output to warn the user to reduce the mechanical input accordingly. For example, this could occur if the peak voltage output from the generator is detected as exceeding 20 volts. Optionally, an overload protection mechanism may be provided either to mechanically or electrically disengage the generator 32 from the battery 36 if the power provided by the drive mechanism exceeds a threshold. Examples of suitable overload protection mechanisms are discussed in WO2015/166235 and WO2014/195681.

Figure 6A:
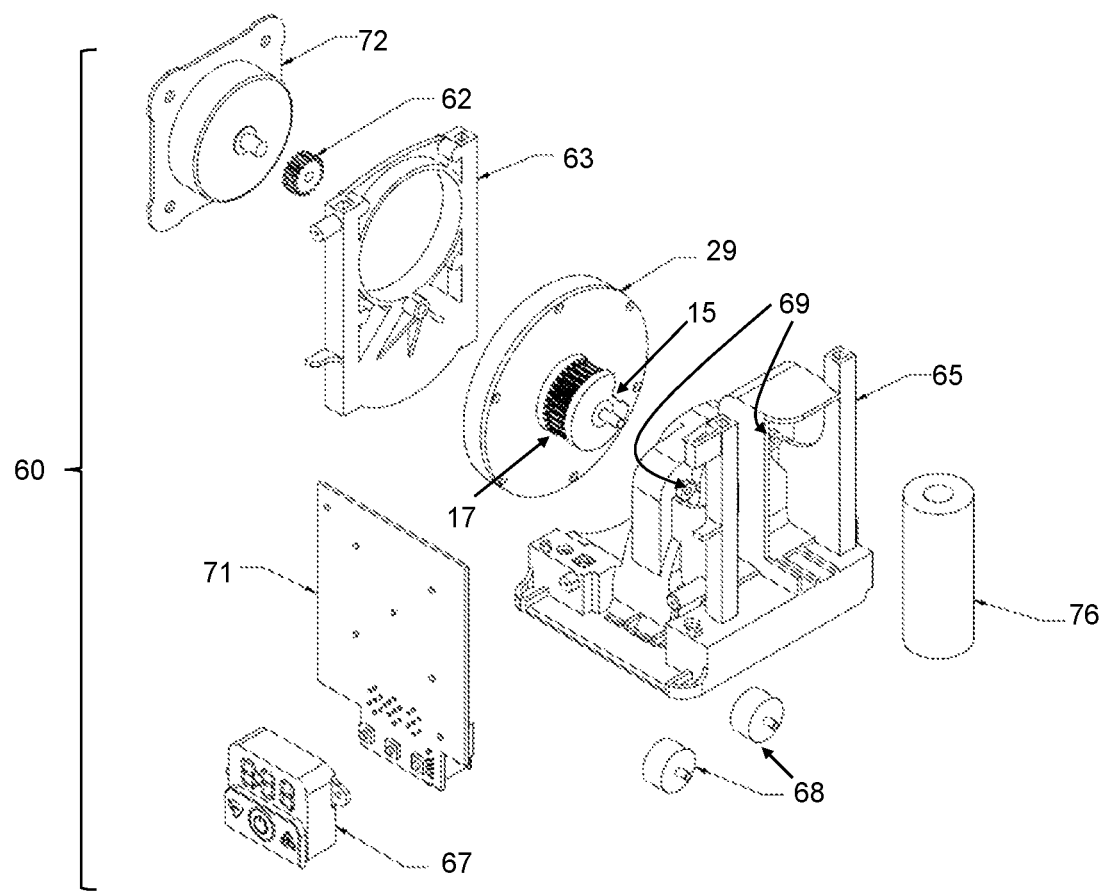
FIG. 6A is an exploded view of an assembly comprising an electrical energy-generating device according to an embodiment.
Figure 6B:
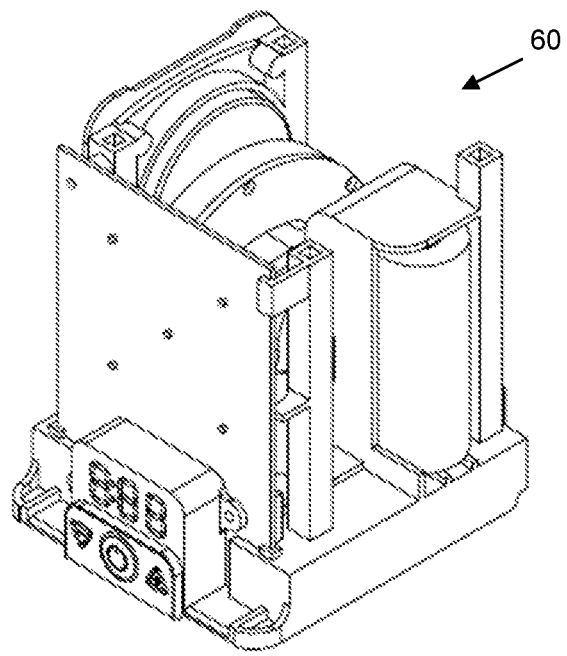
FIG. 6B is a perspective view of a constructed assembly comprising an electrical energy-generating device according to an embodiment.

An exploded view and of an assembly 60 forming part of the apparatus in accordance with an embodiment is shown by FIG. 6A. The constructed assembly 60 is shown by FIG. 6B. The assembly 60 is located within the housing 1 and comprises a generator 72, which is mounted to a generator mount 63. A sprocket 29 is supported within the housing 1 by a chassis 65. The toothed portion 17 and the re-entrant portion 15 of the sprocket 29 earlier discussed with reference to FIG. 3A are visible in FIG. 6A. Two pinching elements in the form of rollers 68 are mounted to the chassis 65 at respective pivot points 69. These rollers 68 are arranged to press the second surface 25 of the elongate flexible member onto the sprocket 29 during its rotation about the sprocket 29. Although not shown, the chassis 65 may be enclosed by a guiding member (typically a curved wall) configured to guide an elongate flexible member that is manually fed by a user into the housing by 180 degrees around the axis of the sprocket 29. This brings the elongate flexible member into engagement with the sprocket 29 and facilitates replacement of the elongate flexible member.

The input mechanical drive is coupled from the sprocket 29 to the generator 72 via a high step-up ratio gear train comprising a generator gear 62 arranged between the generator 72 and the sprocket 29. The chassis 65 further supports a rechargeable battery 76. A PCB 71 is provided for providing an electrical output to a user interface module 67 comprising a display and a control unit, as earlier discussed.

Figure 7:
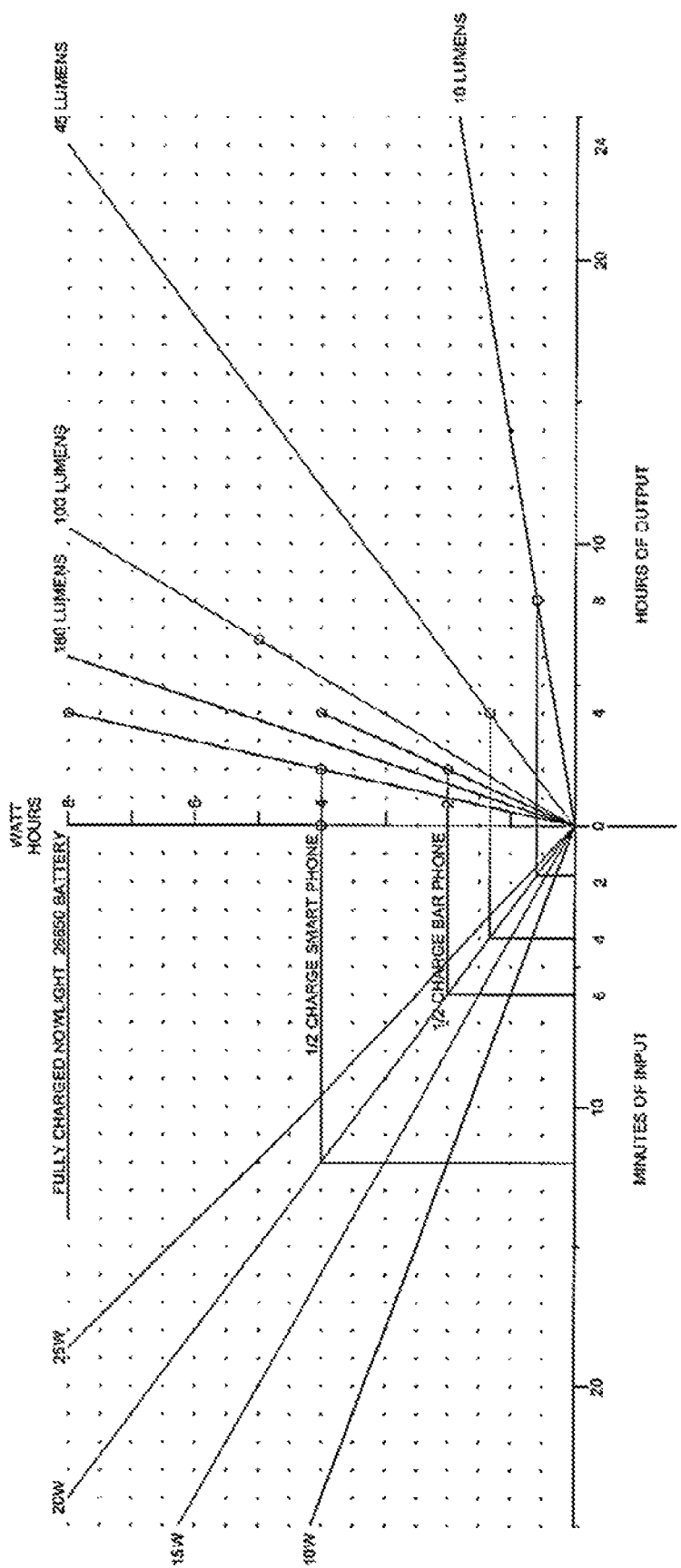
FIG. 7 is a graph illustrating the relationship between the remaining battery life and the mechanical input.

FIG. 7 shows a graph illustrating the relationship between the length of time for which a cumulative mechanical input is provided (either at a power of 10, 15, 20 or 25 Watts), shown on the left-hand side, and the length of time for which the LEDs 2 will remain lit by the battery 36 as a result of the energy provided by this mechanical input, shown on the right-hand side. For example, FIG. 7 shows that enough electrical energy may be generated from 2 minutes of mechanical input at 20 Watts to keep the LEDs 2 lit for 8 hours at 10 lumens. FIG. 7 further shows that 16 minutes of mechanical input at 15 Watts will be enough to keep the LEDs 2 lit for 12 hours at 45 Lumens, about 5 hours at 100 Lumens and 3 hours at 180 Lumens.

In some embodiments no light source is provided. The apparatus may instead be used simply to charge a battery or to provide electrical power to one or more other output devices. The left-hand side of FIG. 7 indicates is the length of time for which the user needs to provide a mechanical input in order to generate sufficient electrical energy to charge the battery of a smart phone or an older style mobile phone referred to as a "bar phone", using the apparatus 10, to a half charge capacity level. For example, FIG. 7 shows that enough electrical energy may be generated by 12 minutes of mechanical input at 20 Watts to charge the battery for a smart phone 22 from 0% to 50% (that is to provide 4 Watt Hours of charge). Similarly, six minutes of mechanical input at 20 Watts is required to charge the battery for a bar phone 22 from 0% to 50% (that is to provide 2 Watt Hours of charge).

Figure 8:
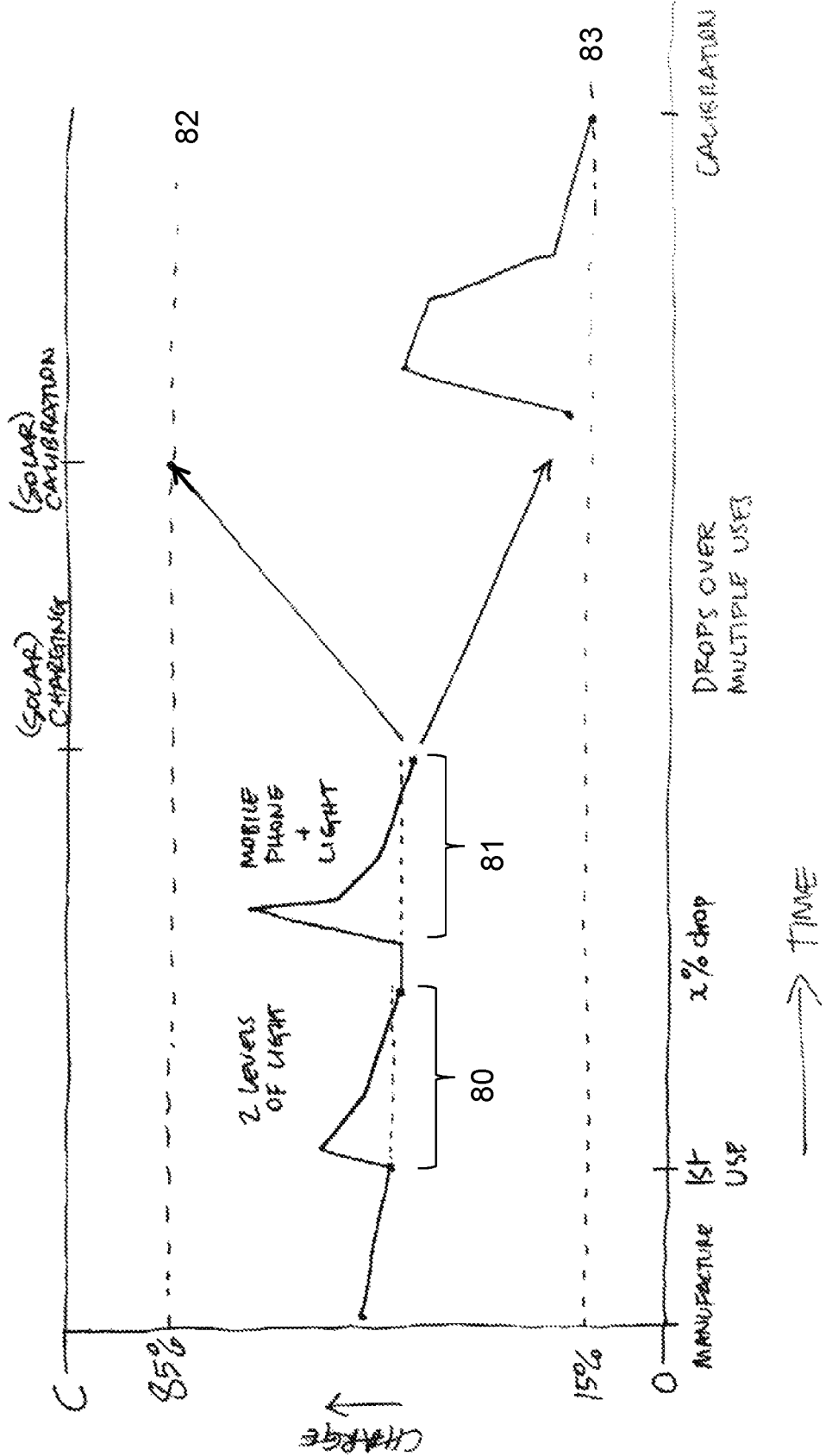
FIG. 8 is a graph illustrating a series of charging and discharging cycles in accordance with an embodiment.

FIG. 8 provides a graph illustrating a series of charging and discharging cycles for calculating the remaining battery life in accordance with an embodiment. The ordinate y-axis indicates the electrical energy stored by the battery as a percentage of its total capacity. This is referred to as "charge". The abscissa x-axis indicates the time elapsed. These two axes are not shown to scale. Each upward profile within the graph indicates input electrical power provided to the battery 36 whereas each downward profile indicates output electrical power output provided by the battery 36. The gradient of these profiles is indicative of the magnitude of the power input or output.

The processor 38 will only be able to monitor the charge of the battery 36 when this charge is at an upper calibration level 82 or a lower calibration level 83. In the illustrated embodiment the upper calibration level is 85% whereas the lower calibration level is 15%. Starting from the lower calibration level 83, the processor 38 will output a remaining battery life of zero (e.g. 0 sec). The processor 38 will monitor the electrical energy stored by the battery 36 in excess of the lower calibration level 83 based on the electrical energy input to the battery 36 since the electrical energy was last detected as being at the lower calibration level. Using this parameter, and by monitoring the instantaneous electrical power supplied by the battery, the remaining battery life can hence be calculated. Alternatively, starting from the upper calibration level 82, the processor 38 may look-up the total energy stored by the battery 36 in excess of the lower calibration level from memory. The remaining battery life can then be calculated as this energy divided by the instantaneous electrical power supplied by the battery 36. The remaining battery life is periodically re-calculated and the result output to the display 4.

However, upon installation to the apparatus 10 the battery 36 will typically have a charge level between the upper and lower calibration levels. At this level the processor 38 may be able to detect that the charge is between the upper and lower calibration levels, however it may not be able to detect the actual electrical energy stored by the battery 36. An initialisation procedure is therefore performed in order to obtain an estimate for the remaining battery life. At the beginning of this procedure the remaining battery life is assumed to be zero. Each time an input mechanical action is provided to the drive mechanism, the processor 38 will monitor the electrical energy input to the battery 36 and calculate the remaining battery life from the electrical power output from battery 36 as before. However, the battery 36 is allowed to discharge by an incremental amount below the initial charge level so that the starting charge successively drops between each charging and discharging cycle. The processor 38 may detect that this initial charge level is reached when the total electrical energy output by the battery 36 is equal to total electrical energy input to the battery 36. Optionally, a tolerance may be included to the estimate for the remaining battery life to account for this additional discharging period. If the processor 38 detects that the upper or the lower calibration level 82, 83 is reached at any stage, the initialisation procedure is ended and the remaining battery life is calculated as earlier described.

For example, FIG. 8 illustrates that, at the point of manufacture, the battery 36 may have a charge of around 50%. This charge will slowly decrease until the first charging and discharging cycle 80 is performed. A relatively small mechanical input is provided at the start of the first charging and discharging cycle 80 so as to raise the charge level by approximately 10%. The battery 36 is operated to power the LEDs 2 initially at a high brightness and then at a lower brightness, resulting in two different downward gradients in the charge profile. Towards the end of the first charging and discharging cycle 80 (when its "starting point" is reached), the processor 38 will allow a further amount of electrical energy to be supplied to the LEDs 2 in excess of the electrical energy input to the battery 36 during the first charging and discharging cycle 80. Consequently, the LEDs 2 may remain lit for an additional period of time (e.g. a minute) thereby utilising some of the electrical energy initially stored by the battery 36 upon its installation.

A period of time then elapses between the first charging and discharging cycle 80 and a second charging and discharging cycle 81 then being performed. At the start of the second charging and discharging cycle 81, a relatively larger mechanical input is provided so as to raise the charge level by around 20%. A mobile phone 22 is also initially connected to the apparatus 10 at the start of the second charging and discharging cycle 81 such that the charge initially decreases at a faster rate. When approximately half of the electrical energy input to the battery 36 during the second charging and discharging cycle 81 has been consumed, the mobile phone 22 is disconnected such that the battery 36 is configured to power only the LEDs 2 (initially at a high brightness and then at a lower brightness, as before). Once again the processor 38 regulates the supply of electrical energy from the battery 36 such that the total energy output from the battery 36 slightly exceeds the total energy input to the battery 36 during the second charging and discharging cycle 81.

The downward pointing arrow extending from the end of the second charging and discharging cycle 81 indicates that the above process may continue until the lower calibration level 83 is naturally reached. In this present embodiment however a photovoltaic cell 20 is connected to the apparatus 10 at the end of the second charging and discharging cycle 81 so as to increase the charge of the battery 36 until the upper calibration level 82 is reached. The initialisation procedure is then terminated and the remaining battery life re-calibrated whenever the upper or lower calibration levels are reached. As a safety feature, further electrical energy is prevented from being input to the battery 36 once the processor 38 detects that the charge is equal to the upper calibration level. Such a mechanism will now be further discussed with reference to FIG. 9.

Figure 9:
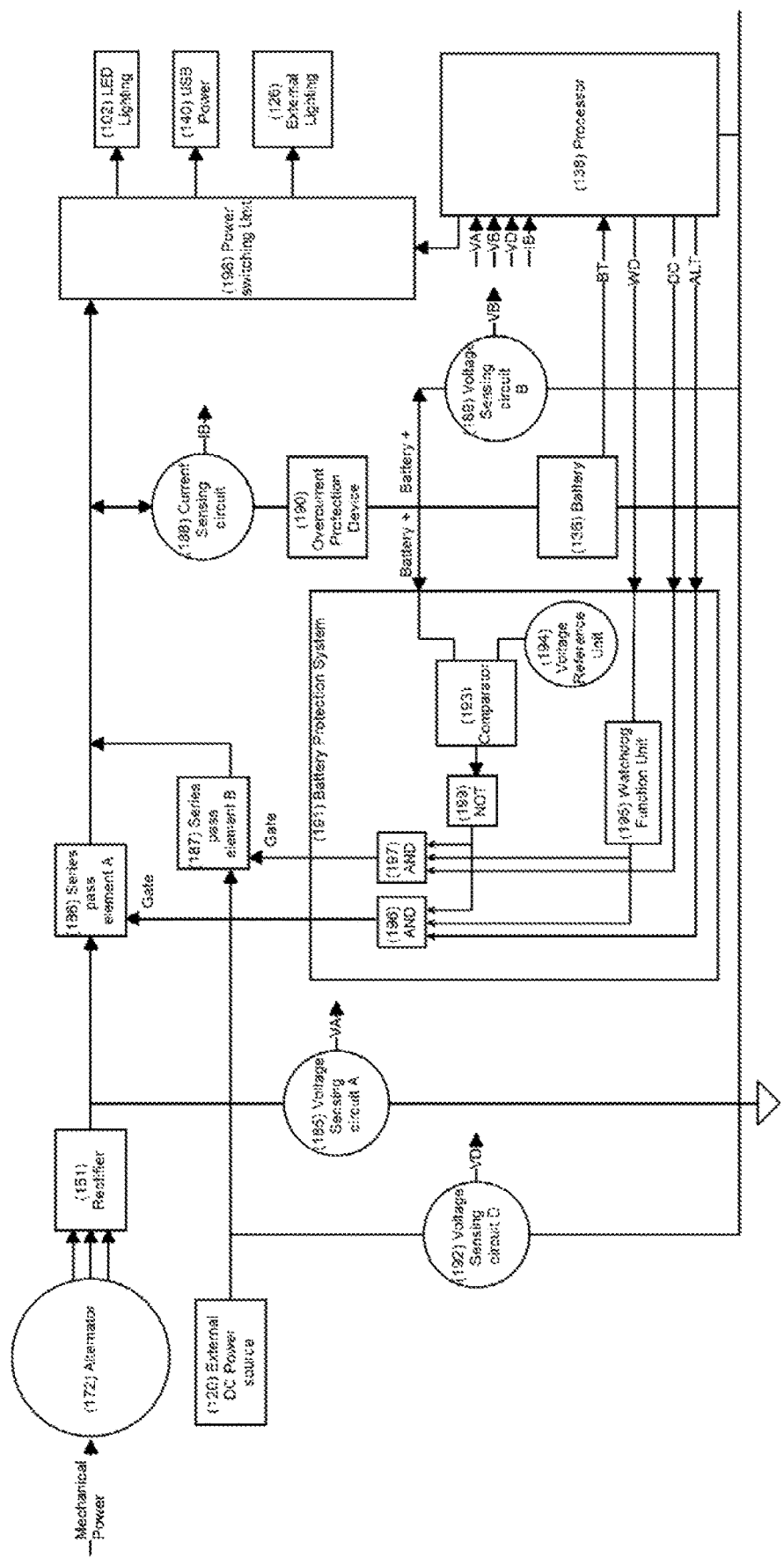
FIG. 9 is a schematic diagram of a battery management system in accordance with an embodiment.

FIG. 9 provides a schematic illustration of a battery management system for an apparatus in accordance with a further embodiment. The apparatus may comprise similar features as discussed, for example, in relation to any of the previous embodiments. In the present embodiment the apparatus further comprises electrical components which function as a cadence control system and a battery protection system for regulating the power supplied to the battery, as will now be described.

Input mechanical action provided to the drive mechanism is converted into an alternating current by an alternator 172. This alternating current is then converted into direct current by a rectifier 151. Voltage sensing circuit A 185 is arranged to between the rectifier and an electrical ground and configured to output a drive measurement signal VA according to the potential difference between these components. The drive measurement signal VA will be proportional to the mechanical power input using the drive mechanism. The electrical power output from the rectifier 151 is then provided to a power switching unit 198 via series pass element A 186. The power switching unit 198 controls the electrical power output to a number of different output devices, including LED lighting 102 (which may be provided within the housing), a USB power output 140 and external lighting 126. An external DC power source 120, such as a solar power source, may also input electrical power to the power switching unit 198, via series pass element B 187. Equivalent input and output devices are shown in FIGS. 4 and 5. Voltage sensing circuit D 192 is arranged so as to provide an external power signal VD according to the potential difference between the output of the external DC power source 120 and an electrical ground.

Series pass elements A and B 186, 187 are electrically connected to a rechargeable battery 136 via a current sensing circuit 188, which outputs a signal IB according to the current input to the battery 136. An overcurrent protection device 190, such as a fuse, is electrically connected between the current sensing circuit 188 and the battery 136, for preventing a dangerously high current from being input to the battery 136.

Voltage sensing circuit B 189 is electrically connected to the positive and negative terminals of the battery 136 and configured to output a signal VB based on the potential difference across the battery 186. This signal will provide an indication of the state of charge of the battery 136. The battery 136 is further provided with an internal temperature sensor which outputs a signal BT based on the battery temperature.

The signals VA, VB, VD, BT and IB are all input to a processor 138, which may take the form of a microcontroller. The processor 138 is electrically connected to the power switching unit 198 for controlling the operation of the different output devices 120, 126, 140 using the power switching unit 198. The processor 138 is further configured to provide three electrical outputs WD, DC, ALT to a battery protection system 191. In the illustrated embodiment the battery protection system 191 is not a single unit but a collection of electrical components which combine to perform a common function. These components include logic units (in particular first and second AND gates 196, 197, and a NOT gate 199), a comparator 193, a voltage reference unit 194 and a watchdog function unit 195.

An electrical signal "Battery+" indicative of the voltage VB across the battery 136 is input to the comparator 193 from between the overcurrent protection device 190 and the battery 136. The comparator 193 is configured to compare this signal against a reference voltage provided by a reference voltage unit 194. If the Battery+ signal exceeds the reference voltage then a positive output is provided by the comparator 193 into the NOT gate 199. Such a scenario may occur when the state of charge for the battery 136 had exceeded a predetermined maximum. A positive signal will therefore only be output by the NOT gate 199 to each of the AND gates 197, 198 if the Battery+ signal is below the reference voltage.

A watchdog function unit 195 (in the form of a transistor) is configured to monitor the presence of a watchdog signal "WD" output by the processor 138 and to provide a positive output to the AND gates 196, 197 in response to the detection of this signal. In the present embodiment the watchdog signal WD is a pulsed binary signal that has a constant frequency, for example at 5 Hz. According to software implemented by the processor 138, the processor 138 will continually output the watchdog signal WD during normal operation of the apparatus. However, if the processor 138 detects the presence of a fault, the signal BT indicates that the battery temperature is above a safe threshold or the processor 138 otherwise develops an error, the watchdog signal WD will no longer be output. This absence of the watchdog signal will be detected by the watchdog function unit 195, which will consequently not provide a positive output to the AND gates 196, 197.

The processor 138 is further configured to output a pulsed binary (square wave) signal referred to herein as the "alternating signal ALT" to the first AND gate 196 only if the drive measurement signal VA is exceeds a drive threshold. Output of the ALT signal may therefore indicate that the mechanical energy input to the alternator 172 has exceeded a predetermined threshold. Finally, a "direct current charge enable signal" DC is output by the processor 138 to the second AND gate 197 only if the external power signal VD is above an input threshold. The DC signal may therefore indicate that the power provided by the external DC power source 120 is sufficiently high so as to enable additional charge to be input to the battery 136.

The first and second AND gates 196, 197 are electrically connected to series pass elements A and B 186, 187 respectively (via a respective gate). As a result, the first AND gate 196 will only output a drive signal to series pass element A 186 when the battery 136 is below the threshold maximum charge, the processor 138 is functioning correctly (or detects no errors) and the mechanical power provided by the alternator 172 is above a given threshold. Similarly, the second AND gate 197 will only output a current to series pass element B 187 when the battery 136 is below the threshold maximum charge, the processor 138 is functioning correctly (or detects no errors) and the power provided by the external DC power source 120 is above its threshold.

Series pass elements A and B 186, 187 are provided in the form of transducers that are operable to provide an adjustable electrical resistance between the input power sources 172, 120 and the battery 136. If a positive output is provided by the first AND gate 196 to series pass element A then this resistance will be low and it will be possible to input electrical energy to the battery 136 by operation of the alternator 172. Similarly if a positive output is provided by the second AND gate 197 to series pass element B then the effective resistance of series pass B will be sufficiently low such that electrical power may be input to the battery 136 by the external DC power source 120.

In the present embodiment the processor 138 is configured to modulate the alternating signal ALT between a fixed high voltage and a fixed low voltage (e.g. zero volts) only. However, this signal may modulate between these two values at an adjustable time period ratio of high voltage duration to low voltage duration. The pulse width of the ALT signal may hence be modulated such that the average power provided by the ALT signal varies according to the mechanical power input to the alternator 172. Therefore if the mechanical power input is relatively high, the average electrical power provided by the first AND gate 196 to series pass element A may be higher than if the mechanical power input is relatively low. Consequently, the electrical resistance provided by series pass element A will be lower on average and so more electrical power will be input to the battery 136. The mechanical resistance provided by the drive mechanism will vary according to the current supplied to the battery 136. Operation of series pass element A 186 in conjunction with the alternating signal ALT is such that an increase in the mechanical power input by the user causes the mechanical resistance provided by the drive mechanism to increase. The rotational velocity of the alternator 172 is therefore regulated. This effect is referred to herein as "cadence regulation". A user who inputs more mechanical power into the alternator 172 will experience greater physical resistance by the action of the drive mechanism, however he or she will also charge the battery 132 at a faster rate than a user inputs less mechanical power into the alternator 172.

A similar process occurs in respect of the external DC power source 120. The series pass element B 187 may be operated to enable the external power source 120 to charge the battery 136 only if the external power signal VD is above an external input threshold, the sensed state of charge of the battery 136 is below the threshold maximum charge and the battery temperature is below a safe threshold. Such a determination is made by the processor 138 in response to the inputs VD, VB and BT. In the event that these criteria are met then the processor 138 will output the DC signal to the second AND gate 197, which is analogous to the ALT signal output to the first AND gate 196. In all other cases no such signal is output by the processor 138 and so a positive signal will not be provided to or from the second AND gate 197. The electrical resistance of series pass element B 187 will consequently be high so as to prevent an electrical current from being supplied to the battery 136 from the external DC power source 120 for charging the battery 136.

The electrical assembly of FIG. 9 therefore provides two key benefits. Firstly a failsafe mechanism in the form of the battery protection system 191 is provided for preventing further electrical energy from being input to the battery 136 if, for example, the processor 138 has developed or detected a fault, or the battery 136 is already fully charged. Such a failsafe mechanism may prevent failure of the battery 136. Secondly, a cadence control system is provided for by the use of the series pass element A 186 in conjunction with voltage sensing circuit A 185 and the processor 138. The cadence control system advantageously enables users to input a higher electrical power to the battery 136 by applying increased mechanical power to the drive system, without needing to rotate the drive mechanism (including the elongate flexible member) at an increased rate. The drive mechanism is rotated manually using hand-over-hand motion, as earlier described. Although very efficient in comparison to some other methods for inputting mechanical action (such as using hand cranks), this motion is difficult to perform manually at a high velocity. It is therefore desirable to control the rotational velocity of the drive mechanism as such so that a high input mechanical action can be provided to the electrical energy-generating device in a more efficient manner.

As will be appreciated, an improved portable apparatus for generating electricity is provided that is able to store and deliver more electrical energy than the prior art. The apparatus also provides a drive mechanism that is easy to operate. Furthermore, the provision of a rechargeable battery enables the apparatus to be used in conjunction with one or more external power sources, such as photovoltaic cells, so as to reduce the frequency with which a user needs to provide a mechanical input. The apparatus may conveniently be provided as a kit together with the external power source(s). Advantageously, although the apparatus uses a fixed capacity battery, the amount of energy that can be consumed per day is not fixed by this. The battery can be charged many times over if required. This is very different from a standard solar system, where there is a need for over-capacity in its panel and battery to compensate for a lack of sunshine during winter. A smaller, lighter battery can therefore be used. The apparatus therefore provides a desirable alternative to existing portable apparatus for generating electricity and is particularly well suited for use in off-grid markets.

The invention claimed is:

1. A portable apparatus for generating electricity, the apparatus comprising:
    an electrical energy-generating device for generating electrical energy in response to input mechanical action;
    a re-chargeable battery configured to store the electrical energy generated by the electrical energy-generating device;
    a mounting element configured to enable the apparatus to be supported at a suspended position relative to the ground during use; and
    a drive mechanism comprising an elongate flexible member provided as a closed endless loop, wherein a portion of the elongate flexible member is exposed so as to enable a user to grasp and pull said portion downward by a distance of at least 30 cm, thereby causing the elongate flexible member to move with respect to the mounting element;

wherein said movement of the elongate flexible member provided directly by the user is the mechanical input that drives the electrical energy-generating device to generate electrical energy.

2. A portable apparatus according to claim 1, further comprising a light source configured to emit light in response to electrical energy supplied by the battery.

3. A portable apparatus according to claim 2, further comprising a mains supply detector configured to detect an outage in a mains electricity supply and to operate the light source in response to the detected outage.

4. A portable apparatus according to claim 1, further comprising one or more output connectors, wherein each said output connector is configured to provide an electrical connection between an external output device and the battery.

5. A portable apparatus according to claim 1, further comprising a control unit configured to control the electrical power supplied by the battery between two or more predetermined values in response to an input provided by a user.

6. A portable apparatus according to claim 1, further comprising a security device configured to control electrical power supplied by the battery based on an authorization procedure.

7. A portable apparatus according to claim 6, wherein the security device comprises an input device and wherein the authorisation procedure comprises monitoring whether a security code is input via the input device and allowing electrical power to be supplied from the battery if said security code is input.

8. A portable apparatus according to claim 1, further comprising:
   a processor configured to monitor the electrical energy stored by the battery and to estimate the remaining battery life based on the monitored electrical energy, wherein the remaining battery life indicates the time remaining before the electrical energy stored by the battery falls below a threshold; and
   an electronic display, wherein the processor is configured to provide a signal to the display so as to cause the display to indicate the remaining battery life, wherein the remaining battery life is calculated in accordance with a power supplied by the battery.

9. A portable apparatus according to claim 1, wherein the exposed portion hangs freely under gravity.

10. A portable apparatus according to claim 1, wherein the drive mechanism is arranged so that the elongate flexible member moves with respect to the mounting element only in response to the mechanical input provided by the user.

11. A portable apparatus according to claim 1, wherein the elongate flexible member is formed from a plurality of modules, wherein each said module comprises a drive surface, a male attachment member and a female attachment member;
   wherein, for each said module the male attachment member is provided on an opposite end of the drive surface from the female attachment member;
   wherein a male attachment member of a first module from the plurality of modules is configured to engage with a female attachment member of a second module from the plurality of modules so as to form a connected element;
   wherein the connected element is formed between the drive surfaces of the first and second modules; and
   wherein the drive mechanism further comprises a sprocket, the sprocket comprising a toothed portion configured to couple with the drive surface of each said module, the sprocket further comprising a re-entrant portion configured to couple with the or each connected element during rotation of the elongate flexible member.

12. A portable apparatus according to claim 11, wherein the circumference of the sprocket is equal to the length of each said module.

13. A portable apparatus according to claim 11, wherein each said module comprises a first surface and a second surface, wherein the first surface is opposite from the second surface, wherein the first surface comprises the drive surface, and wherein the second surface is substantially flat.

14. A portable apparatus according to claim 13, wherein the connected element does not extend below the second surface.

15. A portable apparatus according to claim 1, further comprising a control unit and a battery protection system, wherein the control unit is configured to monitor one or more measurands from the battery and to output a watchdog signal to the battery protection system only if each said measurand is within a respective predetermined range, wherein the battery protection system is configured to monitor the watchdog signal and control the current supplied to the battery from the electrical energy-generating device in response to said watchdog signal.

16. A portable apparatus according to claim 15, wherein said one or more measurands include one or each of the battery temperature and the potential difference across the battery.

17. A portable apparatus according to claim 15, wherein the control unit is further configured to receive a drive signal indicative of the magnitude of the input mechanical action, wherein the control unit is configured to output the watchdog signal only if said drive signal is above a drive threshold.

18. A portable apparatus according to claim 15, further comprising an input connector connectable to an external power source, wherein the battery is further configured to receive electrical energy from the external power source via the input connector, wherein the control unit is further configured to receive an external power signal indicative of the magnitude of the potential difference generated by the external power source, and wherein the control unit is configured to output the watchdog signal only if said external power signal is above an input threshold.

19. A portable apparatus according to claim 1, wherein the drive mechanism provides a mechanical resistance in accordance with the electrical power input to the battery, the apparatus further comprising a cadence control system configured to monitor the input mechanical action and increase the mechanical resistance of the drive mechanism in response to an increase in the input mechanical action so as to increase the electrical power supplied to the battery.

20. A kit comprising an apparatus according to claim 1, and an external power source wherein the battery is configured to receive electrical energy from the external power source.

* * * * *